United States Patent [19]

Agre

[11] Patent Number: 5,978,679

[45] Date of Patent: Nov. 2, 1999

[54] COEXISTING GSM AND CDMA WIRELESS TELECOMMUNICATIONS NETWORKS

[75] Inventor: Daniel H. Agre, San Diego, Calif.

[73] Assignee: QUALCOMM Inc., San Diego, Calif.

[21] Appl. No.: 08/604,786

[22] Filed: Feb. 23, 1996

[51] Int. Cl.[6] .................................................. H04Q 7/20
[52] U.S. Cl. .......................... 455/442; 455/436; 455/437
[58] Field of Search .................................. 455/422, 442,
455/448, 438, 437, 439, 432, 436, 440,
552, 553, 426; 370/331, 335, 320, 328

[56] References Cited

U.S. PATENT DOCUMENTS

| | | | |
|---|---|---|---|
| 4,737,978 | 4/1988 | Burke et al. | 455/438 |
| 4,901,307 | 2/1990 | Gilhousen et al. | 370/18 |
| 4,905,301 | 2/1990 | Krolopp et al. | 455/34 |
| 4,972,455 | 11/1990 | Phillips et al. | 379/59 |
| 5,018,187 | 5/1991 | Marinho et al. | 455/439 |
| 5,101,501 | 3/1992 | Gilhousen et al. | 455/33 |
| 5,109,390 | 4/1992 | Gilhousen et al. | 375/1 |
| 5,164,958 | 11/1992 | Omura | 275/1 |

(List continued on next page.)

FOREIGN PATENT DOCUMENTS

| | | | |
|---|---|---|---|
| 9623369 | 8/1996 | WIPO | H04B 7/26 |
| 9631078 | 10/1996 | WIPO | H04Q 7/38 |

OTHER PUBLICATIONS

Klein S. Gilhousen et al, "Increased Capacity Using CDMA for Mobile Satellite Communication", *IEEE Journal on Selected Areas In Communications*, vol. 8, No. 4, May 1990, pp. 503–514.

TIA Document entitled "CDMA Intersystem Operations" by Alejandro Holcman et al. of QUALCOMM Incorporated, Presented at IEEE Conference on Vehicular Technology Committee in Stockholm, Sweden on Jun. 8, 1994, 5 pages.

TIA TR45.2 Intersystems Operations Presentation entitled "The Wideband Spread Spectrum Standard Under Development in TR45.5" by Edward G. Tiedemann, Jr. of QUALCOMM Incorporated, presented in Atlanta, Georgia, Nov. 16–20, 1992, 9 pages.

TIA Document entitled "Intersystem Operation With The Proposed Wideband Spread Spectrum Dual–Mode Mobile Station–Base Station Compatibility Standard" by Gadi Karmi et al. of QUALCOMM Incorporated, presented May 18, 1992 in Atlanta, Georgia, pp. 1–37.

TIA Document entitled "Alternative Methods for Inter–Channel Handoff" by Charles E. Wheatley, III of QUALCOMM Incorporated, presented on Nov. 10–20, 1992 in Atlanta, Georgia, pp. 1–3.

(List continued on next page.)

*Primary Examiner*—Dwayne D. Bost
*Assistant Examiner*—Tracy M. Legree
*Attorney, Agent, or Firm*—Russell B. Miller; Brian S. Edmonston; Bruce W. Greenhaus

[57] ABSTRACT

A novel and improved method and apparatus for switching the radio interface layer of a wireless telephone call from code division multiple access (CDMA) cellular to GSM time division multiple access (TDMA) cellular during the course of that telephone call or other communication is described. In accordance with one embodiment of the invention, a set of base stations operating in accordance with the GSM standard generate pilot beacons signals in accordance with CDMA technology. During a phone call, a subscriber unit detects CDMA pilot signals, and notifies a base station controller when CDMA pilot signals are detected and the strength at which they are received. The base station controller identifies CDMA pilot signals from CDMA pilot beacon, and initiates a CDMA to GSM handover via the generation of a set of signaling messages which instruct the subscriber unit and receiving GSM infrastructure equipment to prepare for the switching of the radio interface layer. The subscriber unit responds by acquiring the GSM synchronization information and establishing a RF interface with the GSM base station without interrupting the telephone call being conducted.

2 Claims, 3 Drawing Sheets

U.S. PATENT DOCUMENTS

| | | | |
|---|---|---|---|
| 5,184,347 | 2/1993 | Farwell et al. | 370/94.1 |
| 5,235,615 | 8/1993 | Omura | 375/1 |
| 5,267,261 | 11/1993 | Blakeney, II et al. | 375/1 |
| 5,267,262 | 11/1993 | Wheatley, III | 375/1 |
| 5,278,892 | 1/1994 | Bolliger et al. | 379/60 |
| 5,295,153 | 3/1994 | Gudmundson | 375/1 |
| 5,305,308 | 4/1994 | English et al. | 370/32.1 |
| 5,313,489 | 5/1994 | Menich et al. | 375/1 |
| 5,341,397 | 8/1994 | Gudmondson | 375/1 |
| 5,345,467 | 9/1994 | Lomp et al. | 370/331 |
| 5,351,269 | 9/1994 | Schilling | 455/448 |
| 5,416,797 | 5/1995 | Gilhousen et al. | 375/705 |
| 5,438,565 | 8/1995 | Hemmady et al. | 370/60 |
| 5,572,516 | 11/1996 | Miya et al. | 370/18 |
| 5,588,020 | 12/1996 | Schilling | 455/422 |
| 5,594,718 | 1/1997 | Weaver, Jr. et al. | 455/437 |
| 5,640,386 | 6/1997 | Wiederman | 370/320 |
| 5,640,686 | 6/1997 | Norimatsu | 455/552 |
| 5,664,007 | 9/1997 | Samadi et al. | 455/442 |
| 5,680,395 | 10/1997 | Weaver, Jr. et al. | 370/331 |
| 5,682,380 | 10/1997 | Park et al. | 370/331 |
| 5,697,055 | 12/1997 | Gilhousen et al. | 455/436 |

OTHER PUBLICATIONS

TIA Document entitled "Proposed Draft Liason Statement to TR45.2" by Edward G. Tiedemann, Jr. of QUALCOMM Incorporated presented Dec. 3–11, 1992 in Phoenix, Arizona, pp. 1–32.

TIA Document entitled "Intersystem Issues For Support Of The Wideband Spread–Spectrum Digital Standard" by Gadi Karmi of QUALCOMM Incorporated presented Oct. 6, 1992 in Boston, Massachusetts, pp. 1–7.

TIA/EIA Telecommunications Systems Bulletin entitled "Cellular Radiotelecommunications Intersystem Operations: Authentication, Signaling Message Encryption and Voice Privace", May 1993, 9 pages.

EIA/TIA interim Standard entitled "Cellular Radiotelecommunications Intersystem Operations: Intersystem Handoff", Dec. 1991, 18 pages.

TIA/EIA Telecommunications Systems Bulletin entitled "IS–41–B Mobile Border System Problems", Apr. 1994, 26 pages.

TIA/EIA Telecommuncations Systems Bulletin entitled "IS–41–B Support for Dual Mode Wideband Spread Spectrum Mobile Stations", Jan. 1994, 14 pages.

TIA Document entitled "Soft Handoff Frame Format" by Edward G. Tiedemann, Jr. of QUALCOMM Incorporated presented Dec. 11–14, 1995 in Dallas, Texas, pp. 1–7.

TIA/EIA Telecommunications Systems Bulletin entitled "IS–41–B Support for Dual Mode Wideband Spread Spectrum Mobile Stations", Jan. 1994.

COEXISTING GSM AND CDMA WIRELESS TELECOMMUNICATIONS NETWORKS

BACKGROUND OF THE INVENTION

I. Field of the Invention

The present invention relates to wireless telecommunications. More particularly, the present invention relates to a novel and improved method for providing both code division multiple access and time division multiple access wireless telecommunications service in an area having a Global System for Mobile (GSM) communications network.

II. Description of the Related Art

Code division multiple access (CDMA) wireless telecommunications is the next generation of digital wireless telecommunications. CDMA allows wireless telecommunications systems such as cellular telephone systems to provide higher quality wireless telephone service at a reduced cost by more efficiently using the radio frequency (RF) bandwidth available to conduct telephone calls. Additionally, CDMA provides a more reliable, fade-free, RF signal interface than previously existing wireless communication systems and methods. The leading standard for CDMA wireless telecommunications is the IS-95 over-the-air CDMA interface standard, promulgated by the Telecommunications Industry Association (TIA). In addition to the general advantages provided by CDMA noted above, IS-95 CDMA provides soft handoff capability by allowing a subscriber unit (usually a cellular telephone) to engage in multiple RF interfaces simultaneously. Soft handoff increases the likelihood that a subscriber unit will remain connected as the set of base stations with which it interfaces changes in response to changing location.

To allow the widest possible availability of CDMA wireless telecommunication service, it is desirable to reduce the cost associated with the implementation of a CDMA wireless telecommunications system. One such method and system is described in copending U.S. patent application disclosure no. 08/575,413 entitled "WIRELESS TELECOMMUNICATIONS SYSTEM UTILIZING CDMA RADIO FREQUENCY SIGNAL MODULATION IN CONJUNCTION WITH THE GSM A-INTERFACE TELECOMMUNICATIONS NETWORK PROTOCOL" filed Dec. 20, 1995 and assigned to the assignee of the present invention. (CDMA-GSM network application) In the CDMA-GSM network application a wireless telecommunications system using an IS-95, or IS-95 like, over-the-air interface in conjunction with a Global System for Mobile communication (GSM) telecommunications network is described. GSM telecommunications systems represent the previous generation of digital wireless telecommunication systems and utilize a time division multiple access technology over the air interface (GSM-TDMA). Such a wireless telecommunications system allows CDMA telecommunications service to be introduced at a reduced cost in areas having already existing GSM base telecommunication service, because a substantial portion of the previously existing infrastructure can be used to provide the CDMA wireless telecommunication service.

Allowing a CDMA based wireless telecommunications system to be built using preexisting telecommunications infrastructure also raises the possibility of CDMA and GSM-TDMA, or CDMA and other prior art wireless telecommunication communication systems, being simultaneously implemented within the same region or area. Having both CDMA wireless telecommunications service and the preexisting telecommunication service available in the same area has various advantages. These include including the ability to incrementally introduce CDMA service within a service area thereby spreading out the cost of introducing CDMA service over time, as well as the ability to perform limited introductions of CDMA service only in areas where demand for wireless telecommunication service has outstripped the supply provided using the prior art technology. In order to provide total mobility to CDMA service subscribers located in a areas where CDMA and prior art systems coexist, however, a system and method for allowing the subscriber unit to switch between the two types of service during a telephone call is necessary. Since mobility is one of the substantial benefits provided by wireless telecommunications service, such a system and method allowing a subscriber unit to switch between CDMA and another type of cellular telephone service would be highly desirable.

SUMMARY OF THE INVENTION

The present invention is a novel and improved method and apparatus for switching the radio interface layer of a wireless telephone call from code division multiple access (CDMA) modulated to GSM time division multiple access (TDMA) modulation during the course of that telephone call or other communication. In the described embodiment of the invention, a set of base stations operating in accordance with the GSM standard generate pilot beacons signals in accordance with CDMA technology. During a phone call, a subscriber unit detects CDMA pilot signals, and notifies a base station controller when CDMA pilot signals are detected and the strength at which they are received. The base station controller identifies CDMA pilot signals from CDMA pilot beacon, and initiates a CDMA to GSM handover via the generation of a set of signaling messages which instruct the subscriber unit and receiving GSM infrastructure equipment to prepare for the switching of the radio interface layer. The subscriber unit responds by acquiring the GSM synchronization information, and establishing a RF interface with the GSM base station without interrupting the telephone call being conducted.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

A novel and improved method and apparatus for switching the radio interface layer of a wireless telephone call from code division multiple access (CDMA) cellular to GSM time division multiple access (TDMA) cellular during the course of that telephone call or other communication is described. In the following description, the invention is set forth in the context of a radio frequency signal interface operating in accordance with physical signal modulation technique of the IS-95 CDMA over-the-air protocol. While the described invention is especially suited for use with such signal modulation techniques, the use of other code division multiple access wireless telecommunications protocols is consistent with the practice of the present invention, as it the use of the invention at various frequency ranges including, but not limited to, 800–900 MHz and 1800–1900 MHz, as well as satellite based wireless systems. Also, throughout the application the use and transmission of various types of information is described including messages, requests, orders, instructions and commands. It should be understood that this information is constituted by electronic representations of these messages, requests, orders, instructions and commands, that are generated via the use of electric currents, voltage potentials, electromagnetic energy, or a combination thereof. Additionally, the following description contains reference to various systems for manipulation and generation of such information. In the preferred embodiment of the invention, such systems are implemented via the use of digital and analog integrated semiconductor circuits coupled to one another via various conductive connections or via the use of electromagnetic signals, or both. In other instances throughout the application, various well known systems are described in block form. This is done to avoid unnecessarily obscuring the disclosure of the present invention.

Figure 1:
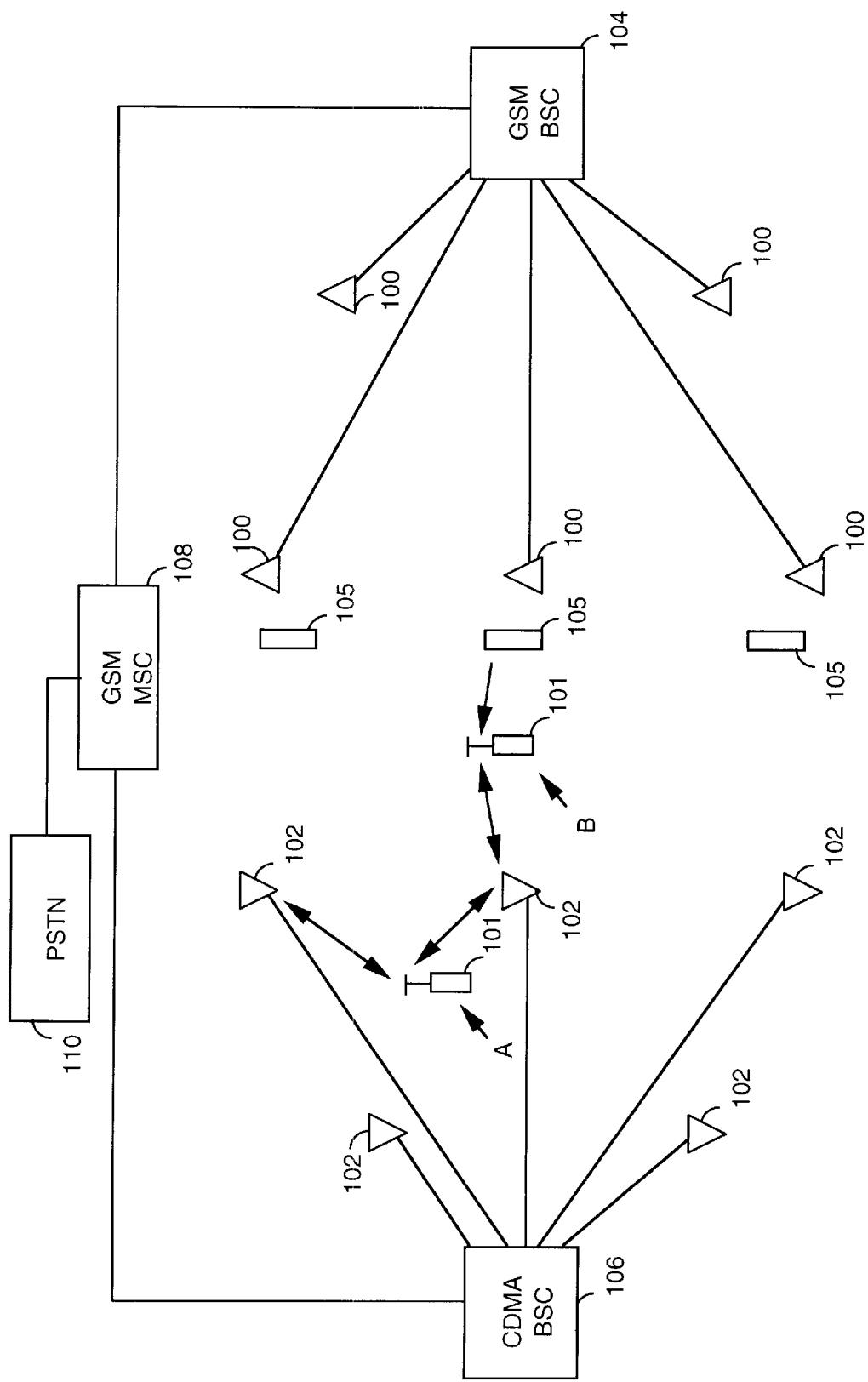
FIG. 1 is an illustration of a cellular telephone system configured in accordance with the present invention.

FIG. 1. is a block diagram of a wireless cellular telephone system configured in accordance with one embodiment of the invention. GSM BTS's 100 and CDMA base transceiver stations (BTS) 102 are distributed across the area being serviced, and CDMA pilot beacons 105 are distributed in the area located between GSM BTS's 100 and CDMA BTS's 102. While CDMA pilot beacons 105 are shown separate from GSM BTS's 100 for ease of drawing, location at or within a GSM BTS 100 is generally preferred although not required. GSM BTS's 100 are coupled to GSM base station controller (GSM-BSC) 104 and CDMA BTS's 102 are coupled to CDMA base station controller (CDMA-BSC) 106. GSM-BSC 104 and CDMA-BSC 106 are coupled to GSM mobile switching center (GSM-MSC) 108. In the preferred embodiment of the invention, GSM-BSC 104 and GSM-MSC 108 operate in accordance with prior art systems used to implement a GSM cellular telephone system. While the system shown is implemented using one GSM-MSC 108, the use of multiple GSM-MSC's 108 is also consistent with the operation of the present invention.

In the embodiment shown, CDMA-BSC 106 is also coupled to GSM-MSC 108. When at location A, subscriber unit 101 is engaged in bi-directional interfaces with two CDMA BTS's 102 via the use of RF signals processed in accordance with CDMA techniques, over which "frames" of data are exchanged. Per conventional terminology, an RF signal transmitted from the CDMA BTS 102 to the subscriber unit 101 is referred to as a "forward link signal", and an RF signal transmitted from the subscriber unit 101 to a CDMA BTS is referred to as a "reverse link signal." Additionally, the state of being simultaneously engaged in a bi-directional interface with two or more CDMA BTS's 102 is referred to as "soft hand-off." A soft hand-off can be contrasted with a "hard hand-off" or "hand-over" during which the RF interface with a first base station is terminated before the RF interface with a second base station is established.

Both traffic data and signaling data must generally be exchanged in order to properly process a telephone call or other communication. Traffic data is the information exchanged by the end parties (subscribers) involved in the telephone call and is usually digitized and "vocoded" voice or other audio information, but may also be data. Vocoded voice is specially encoded digital voice information that requires a minimal amount of digital data to represent the voice or audio signal, and can be considered compressed voice information. Signaling data is comprised of signaling messages used to configure and control the various systems involved in processing the call. In the preferred embodiment of the invention, signaling and traffic data are distinguished when exchanged via the forward and reverse link signals by header bits contained in each frame of data, where the header bits indicate whether the frame contains signaling or traffic data, or both. It should be understood, that a single signaling message may be transmitted via one or more frames containing signaling data. One skilled in the art will recognize the various methods by which traffic and signaling data are exchanged between the various other systems shown in FIG. 1, which include dedicated signaling and traffic data connections, as well as the use of intermediate systems which are not shown.

In the preferred embodiment of the invention, CDMA BTS's 102 physically modulate and transmit RF signals substantially in accordance with IS-95 standard, and therefore generate forward link signals that include one or more pilot channels, paging channels and synchronization channels, as well as a traffic channel for each telephone call or other communication being conducted. Also, pilot beacons 105 transmit one or more forward link signals that preferably include one or more pilot channels. The pilot channels are used to identify CDMA BTS's 102 and pilot beacons 105 and allow subscriber unit 100 to determine proximity to either by signal strength measurements. In a first embodiment of the invention, pilot beacons 105 transmit one or more synchronization and paging channels along with one or more pilot channels, and in a second embodiment of the invention pilot beacons 105 only transmit pilot channels.

The pilot channel is preferably generated via the periodic direct sequence modulation of pilot data with a pilot channel code and a spreading code, in similar a fashion as described in the IS-95 standard. For each CDMA BTS 102 or pilot beacon 105 the application of the spreading code is offset in time by a predetermined amount relative to the application of the spreading code at other CDMA BTS's 102 and pilot beacons 105. The offset associated with each CDMA BTS 102 and pilot beacon 105, along with information indicating whether that offset is associated with a CDMA BTS 102 or a pilot beacon 105, is stored in a pilot database (PDB) accessible by CDMA BSC 106, and preferably located within CDMA BSC 106. In the preferred embodiment of the invention, these time offsets are synchronized to a known reference such as UTC time available on a Global Positioning System (GPS) signal, the use of which is well known in the art. Additionally, the set of GSM base stations located in close proximity to each pilot beacon 105 is also stored in the time offset database, or in another database that may be cross indexed with the time offset database.

When activated, but not processing a telephone call, subscriber unit 101 is said to be in idle mode. During idle mode, subscriber unit 101 repeatedly performs an idle mode searching procedure during which it searches for CDMA pilot channels within forward link signals from CDMA BTS's 102 and CDMA pilot beacons 105. When a pilot channel is detected, subscriber unit 101 attempts to process an associated synchronization channel. If the pilot channel is from a CDMA BTS 102, the synchronization channel will be processed normally. If the pilot channel is from a pilot beacon 105, the synchronization and paging channel will either indicate that the source of the pilot channel is a pilot beacon 105, or no synchronization and paging channel will be detected, which also indicates to subscriber unit 101 that the source of the pilot channel is a pilot beacon 101. If no pilot channels are detected, or the only pilot channels detected are from pilot beacons 105, subscriber unit 101 will either enter into or return to GSM-TDMA mode. Otherwise, subscriber unit 101 will either enter into or return to CDMA mode.

As described above, subscriber unit 101 conducts a telephone call in CDMA mode via a bi-directional RF interface with one or more CDMA BTS's 102. During such a telephone call subscriber unit 101 continues to search for pilot channels from both the set of CDMA BTS's 102 with which it is currently communicating, as well as from other CDMA BTS's 102 and pilot beacons 105. For each pilot channel detected, a pilot strength measurement is made. In the preferred embodiment of the invention, this strength measurement constitutes the sum of the ratios of pilot energy per chip, Ec, to the total received spectral density (noise and energy), Ic, for the set of multipath components associated with the particular pilot channel. Those skilled in the art will recognize various alternative measures of signal strength. Multipath refers to reflected "copies" of a forward link signal that are received by subscriber unit 101 which differ in strength and time and which are summed together for further processing, various techniques for which are also well known in the art.

When a pilot strength measurement report is received indicating that one or more particular conditions exist, CDMA-BSC 106 generates a set of signaling messages that cause subscriber unit 101 to establish a new RF interface with one of GSM BTS's 100, and to continue processing the call via that new wireless telecommunications interface. Additionally, CDMA-BSC 106 causes the resources that had previously been processing the call within any CDMA BTS's 102 and itself to be released for processing a new call or other communication. The particular condition or conditions that will cause CDMA-BSC 106 to generate such a set of signaling messages that are different in various embodiments of the invention, which are described in more detail below.

Figure 2:
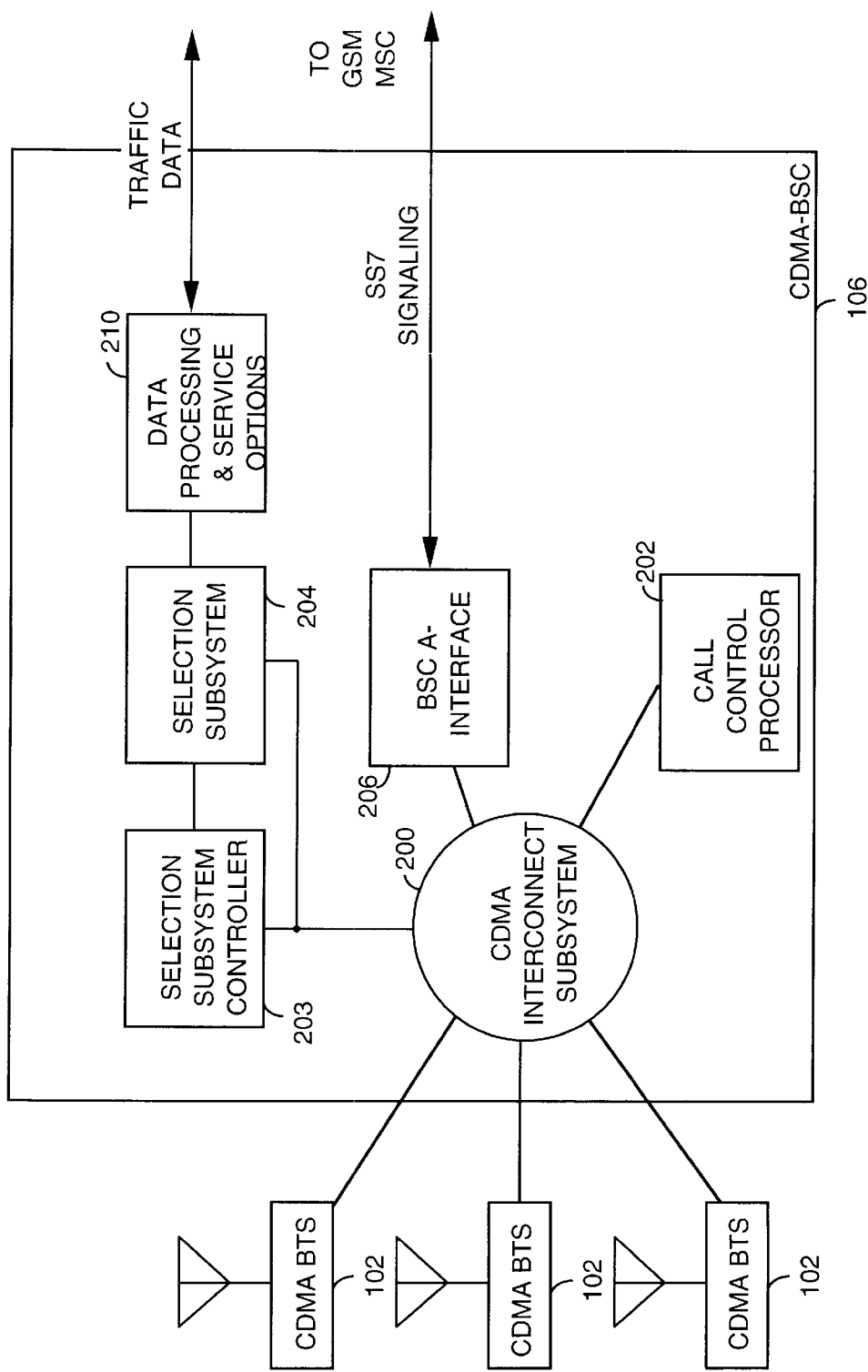
FIG. 2 is a block diagram of a base station controller configured in accordance with one embodiment of the invention.

FIG. 2. is a block diagram of CDMA-BSC 106 and a set of CDMA BTS's 102 when configured in accordance with one embodiment of the invention. CDMA BTS's 102 are coupled to CDMA-BSC 106 via wirebased links, which in the preferred embodiment of the invention constitutes a T1 or E1 connection, although other connections may be substituted including the use of microwave links. CDMA interconnect subsystem 200 is coupled to the set of CDMA BTS 102 shown. CDMA interconnect subsystem 200 is also coupled to call control processor 202, selection subsystem controller 203, selection subsystem 204, and BSC A-interface 206. CDMA interconnect subsystem 200 serves as a message and traffic router between the connected coupled entities and in the preferred embodiment of the invention is comprised of an asynchronous fixed length packet transport system. Data processing and service options system 210 and BSC A-interface 206 are coupled to GSM-MSC 108 of FIG. 1. Data processing and service options system 210 exchanges traffic data with GSM-MSC 106, and BSC A-interface 206 exchanges signaling data with GSM-MSC 106. In the preferred embodiment of the invention, the signaling data is transmitted between BSC A-interface 206 and GSM-MSC 108 using the ITU Signaling System Number 7 (SS7) transport protocol as specified in the GSM A-interface protocol, the use of which is well known in the art.

In the preferred embodiment of the invention, CDMA BTS's 102 and the systems within CDMA-BSC 106 communicate and exchange traffic and signaling data via the use of an internal BSS protocol in which fixed length data packets are exchanged among the various other systems via CDMA interconnect subsystem 200, or via direct routing between the two systems involved. CDMA interconnect subsystem 200 performs this routing via the use of an address contained in each fixed length data packet. Generally, a first system transmitting a data packet to a second system places the address of that second system in the data packet, and then provides that data packet to CDMA interconnect subsystem 200. In the case of some adjacent systems, such as selection subsystem 204 and data processing and service option system 210, data packets may be passed directly. A particular fixed length packet can contain traffic data or signaling data, which is indicated by packet header bits contained in each packet. In similar fashion to the frames transmitted via the forward and reverse signals, one signaling message may be transmitted via one or more data packets.

During the operation of CDMA-BSC 106, call control processor 202 and BSC A-interface 206 generate signaling messages that configure and control the operation of CDMA-BSC 106. This configuration and control includes the allocation of selectors within selection subsystem 204 for processing a telephone call or other communication. The processing performed by a selector includes receiving a frame from each CDMA BTS 102 interfacing with subscriber unit 101 at any particular time, and selecting one of those frames for further processing based on quality indication information included in each frame. Additionally, a selector generates multiple instances of a frame to be transmitted to subscriber unit 101 in the forward link direction, and forwards one instance of the frame to each CDMA BTS 102 with which subscriber 101 is interfacing with at the time. The configuration and control of CDMA-BSC 106 performed by BSC A-interface 206 and call control processor 202 also includes the allocation of signal processing resources within service options systems 210. The processing performed by these signal processing resources include the vocoding and packetization of traffic data directed towards subscriber unit 101, and the devocoding of traffic data generated by subscriber unit 101 and received by way of selection subsystem 204.

Figure 3:
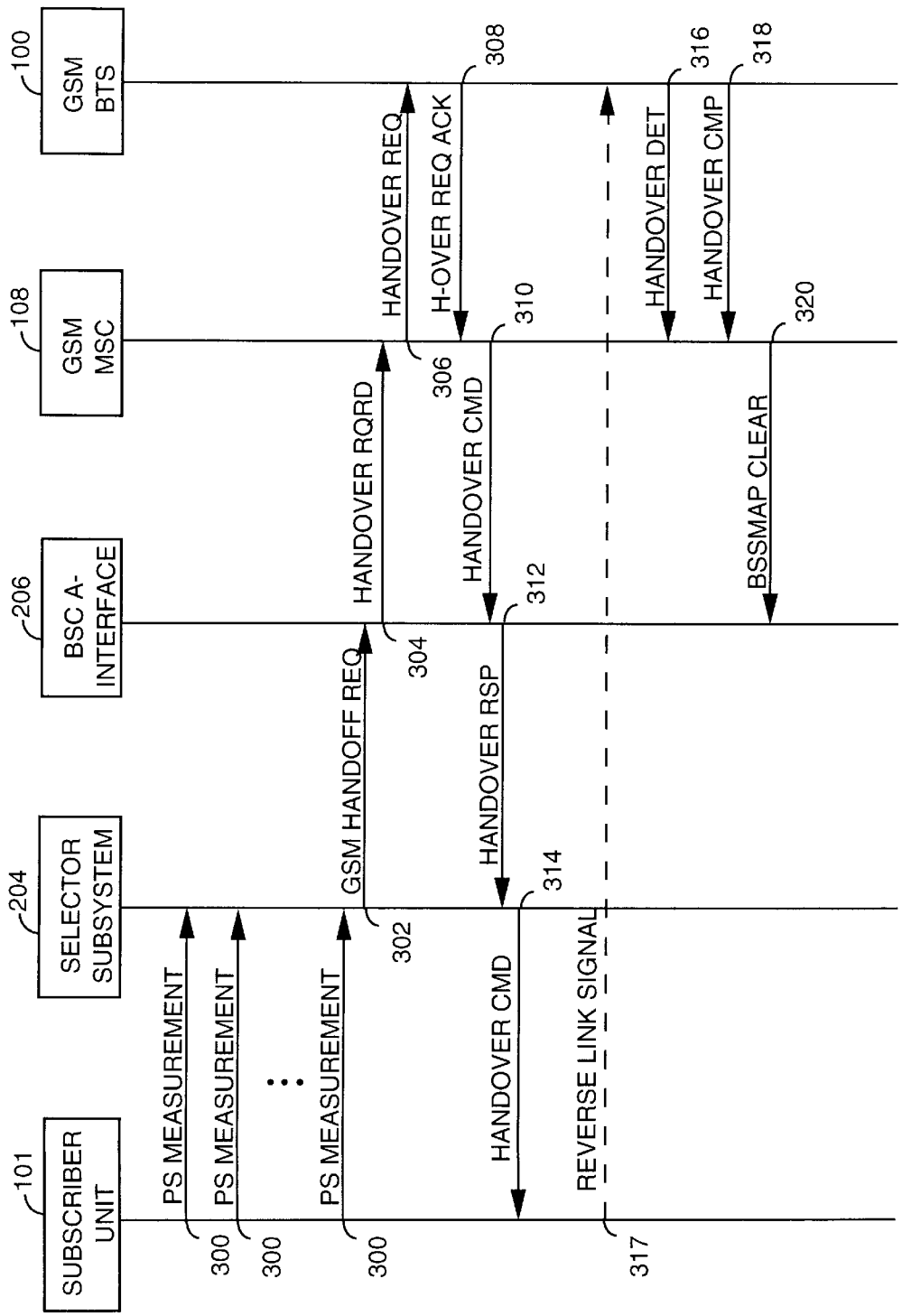
FIG. 3 is a timing diagram illustrating the messages exchanged during a handover performed in accordance with one embodiment of the invention.

FIG. 3 is a message sequence diagram illustrating a set of messages exchanged between the various systems shown in FIG. 1 during the transition of subscriber unit 101 from CDMA to GSM-TDMA telecommunications service when performed in accordance with one embodiment of the invention. The vertical lines shown in FIG. 3 are each associated with the system identified in the box at the top of each line. The systems are subscriber unit 101, selector subsystem 204, call control processor 202, data processing and service options system 210, BSC A-interface 206, GSM-MSC 108, and GSM-BSC 104. A horizontal arrow running between two vertical lines indicates the exchange of a signaling message between the associated systems. Time advances from top to bottom, so the higher up horizontal lines occur before those horizontal lines located lower down. Messages exchanged between subscriber unit 101 and selector subsystem 204 actually pass through CDMA BTS 102, but are shown as a single lines between the subscriber unit 101 and selector subsystem 204 for ease of drawing. Similarly, messages exchanged between GSM-MSC 108 and a GSM BTS 100 are also processed by GSM-BSC 104 but are shown as single lines as well.

As described above, during a stable telephone call or other communication, subscriber unit 101 constantly searches for pilot channels transmitted from either a CDMA BTS 102 or a pilot beacon 105 and transmits a pilot strength measurement report 300 to CDMA BSC 106 when any one of a set of conditions described below are met. Each strength measurement report from subscriber unit 101 contains identification information that will allow the source of the measured pilot channel or channels to be identified. This identification information can take many forms including the time offset associated with the pilot channel, or an index value that can be understood by both CDMA BSC 106 and subscriber unit 101. A prior art method and system utilizing such strength measurement reports is set forth in U.S. Pat. No. 5,267,261 entitled "MOBILE STATION ASSISTED SOFT HANDOFF IN A CDMA CELLULAR COMMUNICATIONS SYSTEM", issued Nov. 30, 1993 and assigned to the assignee of the present invention.

Within CDMA-BSC 106 selector subsystem 204 receives pilot each strength measurement report 300 and determines whether the associated pilot channel is from either a CDMA BTS 102 or pilot beacon 105 using the pilot database, which in the preferred embodiment of the invention is located within selection subsystem controller 203. Upon receipt of a pilot strength measurement report that indicates one of the predetermined conditions exists as described in detail below, selector subsystem 204 initiates a handover via the transmission of handover command 302 to BSC A-interface 206. BSC A-Interface 206 responds to handover request 302 by transmitting handover required 304 to GSM-MSC 108 which indicates the identity of subscriber unit 101 as well as one or more GSM-BSC's when subscriber unit 101 is located near as indicated in the offset database in a preferred order. Per the prior art operation of GSM-MSC 108, handover request 306 is transmitted to the one or more GSM-BSC's 106 specified in handover required 304 indicating the forward and reverse link GSM-TDMA channels over which the call should be conducted. GSM-BSC's respond by transmitting handover acknowledge 308 to GSM-MSC 108 and by starting a search for a GSM reverse link signal transmitted from subscriber unit 101.

Additionally, GSM-MSC 108 responds to handover request acknowledge 308 by transmitting handover command 310 to BSC A-interface 206 which indicates the GSM-TDMA forward and reverse link channels over which the call should be conducted. BSC A-interface 206 responds by forwarding the forward and reverse link GSM-TDMA channel information to selector subsystem 204 via GSM-TDMA handoff response 312. Similarly, selector subsystem 204 forwards the GSM-TDMA channel information to subscriber unit 101 via handover command 314. Subscriber unit 101 responds by switching from CDMA mode to GSM-TDMA mode, and by transmitting reverse link TDMA signal 317 via the assigned GSM-TDMA reverse link traffic channel as well as searching for the forward link GSM-TDMA traffic and control channels from a GSM BTS 100. GSM BTS 100 then begins to search for reverse link TDMA signal 317 from subscriber unit 100 and upon detection transmits handover detect 316 to subscriber unit 101 via the forward link GSM-TDMA traffic channel assigned to process the telephone call. Additionally, GSM BTS 100 transmits handover complete 318 to GSM-MSC 108, which responds by transmitting BSSMAP clear 320 to BSC A-interface 206. Upon receipt of BSSMAP clear 320, BSC A-interface initiates a resource release sequence which releases the resources within CDMA-BSC 106 and any CDMA BTS's 102 associated with the call for processing another telephone call. It should be noted that the set of signaling messages generated and received by GSM-MSC 108 and GSM-BSC 104 are substantially in accordance with the prior art operation of such systems in the preferred embodiment of the invention.

In accordance with the exemplary embodiment of the invention described herein, subscriber unit 101 maintains a pilot parameter database (PPDB) to determine when strength measurement reports should be generated and transmitted to the selection subsystem 204 within BSC 106. The PPDB includes a list of pilot channels, associated pilot channel set categories, and pilot set threshold values T_ADD, T_COMP, T_DROP, and T_TDROP. The set of categories include an Active Set, a Candidate Set, a Neighbor Set, and a Remaining Set. The Active Set includes any pilots channels from a CDMA BTS 102 with which a bi-direction interface has been established. The Candidate Set includes pilot channels not in the Active Set, but which have been received with a pilot strength measurement above T_ADD. The Neighbor Set includes pilot channels which are not in the Active or Candidate Set, but which have been indicated as likely candidates for handoff by signaling messages from CDMA-BSC 106. The Remaining Set includes all other pilot channels in the system not in the Active, Candidate, or Neighbor Sets. The values of T_ADD, T_COMP, T_DROP, and T_TDROP are initially set to default values stored within subscriber unit 101, but can be modified via signaling messages transmitted from CDMA-BSC 106, and T_DROP is less than T_ADD.

Using the PPDB, subscriber unit 101 sends strength measurement reports to CDMA-BSC 106 when any of the following conditions occur:

1) The strength measurement of a pilot channel in the Neighbor or Remaining set exceeds T_ADD;

2) The strength measurement of a pilot channel in the Candidate Set exceeds the strength of a pilot channel in the Active Set by an amount T_COMP×0.5 dB, and a pilot strength measurement report has not been sent with respect to this pilot channel since the last handoff directive was received;

3) A handoff drop timer, also maintained within subscriber unit, expires and a pilot strength measurement report has not been sent since the last handoff directive or extended handoff directive was received; or 4) The strength of an Active Set member has been less than T_DROP for a time interval T_TDROP.

Thus, in an exemplary position change from location A to location B, subscriber unit 101 will detect a pilot channel from pilot beacon 105 with increasing strength due to the reduced distance or reduced blockage. As the pilot strength measurement of the pilot channel from pilot beacon 105 first increases above T_ADD, subscriber unit 101 will add the pilot channel to the Candidate Set and generate a signal strength measurement report to CDMA-BSC 106. Then, as the strength measurement of the pilot channel increases to T_COMP×0.5 dB above that of a pilot from a CDMA BTS 102 with which an RF interface has been established, subscriber unit 101 will transmit a second strength measurement report to CDMA BSC 104. Should the pilot channel strength of a pilot from one or more CDMA BTS's 102 fall below T_DROP for a time interval of T_TDROP during the transmission from location A to location B, subscriber unit 101 will also generate a pilot strength measurement report.

Upon receiving a pilot strength measurement report, CDMA-BSC 106 determines whether the pilot channel is associated with a CDMA BTS 102 or pilot beacon 105 using the identification information and the pilot database (PDB) described above. In a first embodiment of the invention, CDMA-BSC 106 monitors the pilot strength measurement reports for indication that the strength of the pilot channel from a pilot beacon 105 is 0.5 dB plus T_COMP above the strength of a pilot channel in the active set. When such an indication is received, CDMA_BSC 106 initiates the handover to GSM service as described above. While this first embodiment causes the handover to GSM service to occur somewhat earlier than necessary, it prevents the CDMA link from substantially degrading before the service is switched, thus ensuring the quality of the call. This first embodiment is especially good where CDMA coverage is collocated with GSM coverage because the availability of GSM service can be ensured when the handover processes is initiated.

In a second embodiment of the invention, CDMA-BSC 106 monitors the pilot strength measurement reports for indication that the strength of the last pilot channel in the active set from a CDMA BTS 102 has fallen below T_DROP for time interval T_TDROP. When such an indication is received, CDMA_BSC 106 initiates the handover to GSM service as described above. This second embodiment is useful where it is desirable to maintain CDMA service for as long as possible before transitioning to GSM service. In a third embodiment of the invention, the handover procedure is also initiated when the strength of the last pilot channel in the active set from a CDMA BTS 102 has fallen below T_DROP for a time interval T_TDROP, however, the use of pilot beacons 105 is eliminated, and thus no strength measurements for pilot channels from a pilot beacon 105 are generated. This third embodiment is especially useful where installation of pilot beacons 105 is not feasible.

In additional embodiments of the invention, subscriber unit 101 utilizes an additional value T_HANDOFF which is also stored in the PPDB. Similar to the use of the other variables described above, a default value for T_HANDOFF is stored in subscriber unit 101, but the value T_HANDOFF may be changed via signaling messages transmitted from a CDMA-BSC 106. In a first embodiment of the invention utilizing T_HANDOFF, CDMA-BSC 106 notifies subscriber unit 101 when a pilot strength measurement report indicates a pilot channel from a pilot beacon 105 has been detected above T_ADD. Subscriber unit 101 then stores that the pilot channel is generated by a pilot beacon 105 within the PPDB, and generates a pilot strength measurement report 300 when that pilot channel is received at a strength that exceeds T_HANDOFF. Upon receipt of this pilot strength measurement report, CDMA-BSC 106 initiates the handoff to GSM-TDMA service as described above. In this embodiment of the invention T_HANDOFF is greater than T_ADD.

In a second embodiment of the invention utilizing T_HANDOFF, subscriber unit 101 generates a pilot strength measurement report when every pilot channel from a CDMA-BTS 102 is received with a strength that is less than T_HANDOFF for a time period T_THANDOFF. T_THANDOFF is an additional value stored within a subscriber unit 100 but which can be modified via signaling messages from CDMA-BSC 106. Upon receipt of this pilot strength measurement report, CDMA-BSC 106 initiates the handoff to GSM-TDMA service as described above. In the preferred implementation of this embodiment, T_HANDOFF is greater than T_DROP, as it is desirable to perform the handoff before the CDMA service degrades to unacceptable levels. However, the use of a T_HANDOFF that is less than T_DROP is not inconsistent with the practice of the present invention.

By performing a handover in the various ways described above, CDMA wireless telecommunication service can be provided within a GSM telecommunications network, and in conjunction with GSM-TDMA wireless telecommunications service, in a manner that allows a subscriber to switch from one type of service to another during the course of a telephone call. This allows the wireless telecommunications service subscriber to receive the benefits of CDMA telecommunications service where such benefits are of greatest use, while also enjoying the complete mobility provided by a same service system. Additionally, the above described method and system allows the CDMA service to be introduced with little or no modification to the existing GSM infrastructure in that the commands and responses required by the GSM systems are those already performed during the course of a normal GSM to GSM inter system handover or hard hand-off. This allows the CDMA service to be introduced with a minimum of cost, and therefore in a highly efficient manner.

Thus, a method and system for coexisting CDMA wireless telecommunications service with GSM-TDMA wireless telecommunications service is described. To one skilled in the art, various alternative embodiments of the invention will be apparent. The embodiment described above is provided for purposes of illustration and example only, and should not be construed as limiting the scope of the invention which is set forth in the following claims.

I claim:

1. A method of switching a subscriber unit in a wireless telecommunications system from a code division multiple access radio frequency signal interface to Global System for Mobile communication time division multiple access radio frequency signal interface during a telephone call, comprising the steps of:

determining that the subscriber unit is in a predetermined condition while in code division multiple access mode, said predetermined condition occurring when a strength of a pilot channel from a pilot beacon exceeds a strength of a pilot channel in an active set by an amount 0.5 dB greater than a value T_COMP;

transmitting data to and from the subscriber unit in accordance with Global System for Mobile communications over-the-air interface;

determining a strength for a set of pilot channels received by the subscriber unit; and generating a pilot strength measurement report indicating said signal strength for each pilot channel received.

2. A method for subscriber unit handover from code division multiple access wireless telecommunications service to Global System for Mobile communications time division multiple access wireless telecommunications service, comprising the steps of:

exchanging data between the subscriber unit and a base transceiver station via radio frequency signals modulated in accordance with code division multiple access techniques;

determining that the subscriber unit is on a coverage edge by generating a set of signal strength measurements on a set of pilot channels received by said subscriber unit, and determining whether a strength of a pilot channel from a pilot beacon exceeds a strength of a pilot channel in an active set by an amount 0.5 dB greater than a value T_COMP;

notifying a Global System for Mobile communications base station that said subscriber unit requires service; and instructing said subscriber unit to operate in accordance with Global System for Mobile communications time division multiple access standards.

* * * * *